United States Patent
Lacoste

(10) Patent No.: US 7,141,228 B2
(45) Date of Patent: Nov. 28, 2006

(54) METHOD FOR CALCIUM NITRIDE SYNTHESIS

(75) Inventor: Francois Lacoste, Neuilly-sur-Seine (FR)

(73) Assignee: Francois Lacoste, Neuilly-sur Seine (FR)

(*) Notice: Subject to any disclaimer, the term of this patent is extended or adjusted under 35 U.S.C. 154(b) by 222 days.

(21) Appl. No.: 10/515,826

(22) PCT Filed: Jun. 13, 2003

(86) PCT No.: PCT/FR03/01782

§ 371 (c)(1),
(2), (4) Date: Nov. 26, 2004

(87) PCT Pub. No.: WO2004/005185

PCT Pub. Date: Jan. 15, 2004

(65) Prior Publication Data

US 2005/0118087 A1    Jun. 2, 2005

(30) Foreign Application Priority Data

Jul. 2, 2002   (FR) .................................. 02 08269

(51) Int. Cl.
C01B 21/06    (2006.01)
(52) U.S. Cl. ..................................... 423/409
(58) Field of Classification Search ................. 423/409
See application file for complete search history.

(56) References Cited

U.S. PATENT DOCUMENTS 2,467,647 A    4/1949   Alexander
3,692,474 A    9/1972   Arber et al.
6,007,641 A *  12/1999  Vines et al. ................... 134/26
6,398,125 B1   6/2002   Liu et al.

FOREIGN PATENT DOCUMENTS

DE         494 212 C       3/1930
DE         196 23 351 A1   12/1997
WO         WO 94/18120     8/1994

OTHER PUBLICATIONS

Chem et al., "Synthesis, structure, and properties of calcium zinc nitride (Ca2ZnN2)," STN Database accession No. 114:34737 CA XP002240600, 1990, no month.
Moissan "Comptes Rendus De l'á l'Académie des Sciences," vol. 127, pp. 497 to 501, 1898, no month.
Itkin et al., "The Ca-N (Calcium-Nitrogen) System," Bulletin of Alloy Phase Diagrams, vol. 11, No. 5, pp. 497-503, 1990, no month.
Aubry et sl., "Rapports á l'Académie des Sciences", C.R. Acad. SC. Paris, vol. 263, pp. 931 to 934, 1966, no month.

* cited by examiner

*Primary Examiner*—Wayne Langel
(74) *Attorney, Agent, or Firm*—Oliff & Berridge, PLC

(57) ABSTRACT

The invention concerns a method for calcium nitride synthesis which consists in spraying in form of droplets, by means of a sprayer, a molten zinc-calcium alloy into a reactor containing nitrogen at high temperature. The resulting calcium nitride is collected in a collector unit at the lower part of the reactor. The zinc contained in the droplets is evaporated and condensed on the cooled walls of the reactor and can be reused for preparing another alloy. The zinc-calcium alloy is obtained by electrolysis of calcium chloride in an electrolytic cell whereof the cathode is a solution containing molten zinc.

13 Claims, 4 Drawing Sheets

METHOD FOR CALCIUM NITRIDE SYNTHESIS

BACKGROUND OF THE INVENTION

The invention relates to a calcium nitride synthesis process according to which nitrogen is made to react with a calcium source in a reactor.

STATE OF THE ART

Synthesis of calcium nitride by heating pure calcium in the presence of nitrogen has been known since the works of Henri de Moissan (Comptes Rendus à l'Académie des Sciences, 1898, Vol. 127, pages 497 to 501). He determined that the chemical composition of the compound obtained is $Ca_3N_2$ and that its density is 2.63. V. P. Itkin and C. B Alcock (Bulletin of alloy phase diagrams, 1990, Vol II No. 5, pages 497 to 503) showed that the melting point of calcium nitride is close to 1450° C. and that it only decomposes around 1600° C.

When studying the kinetics of the nitriding reaction of bulk calcium, J. Aubry and R. Streiff (Rapports à l'Académie des Sciences, 1966, Vol. 263, pages 931 to 934) indicated that the reaction between high purity calcium obtained by bisublimation and dry nitrogen begins at 200° C., but that the weight increase remains small up to about 500° C. The calcium is in fact covered right from the beginning of the experiment with a compact, very adherent layer of dark blue nitride with a metallic lustre, considerably slowing down the reaction speed. The very thin film thus formed which corresponds to a weight gain of less than 10 $mg/cm^3$ is very stable. Experiments carried out for 50 hours at 600° C. did not show any resumption of the reaction.

Above 650° C., the reaction resumes, the nitrogen diffusing in molecular state to the calcium-nitride interface, the seat of the reaction. This change in the reaction kinetics corresponds to the allotropic transformation of the calcium nitride which goes from a quadratic structure to a cubic structure. This study of the nitriding reaction kinetics did not however enable an industrial calcium nitride fabrication process to be developed.

Others replaced the pure calcium, industrially not economical, by calcium obtained industrially in the form of turnings, and observed that the nitriding reaction did not begin below 600° C. and that the temperature had to be increased to over 650° C. and even preferably to 700° C. to have a significant reaction kinetics. Difficulties arise as soon as it is sought to speed up the reaction by increasing the flow of nitrogen in contact with the calcium. The nitriding reaction is in fact highly exothermal, thus giving off about 425 kilojoules per mole of calcium nitride ($Ca_3N_2$), which corresponds to a theoretical adiabatic temperature of more than 4000° C.

As soon as the nitrogen input increases, the reaction accelerates considerably, causing a temperature increase which exceeds the melting temperature of calcium which is about 839° C. The molten calcium is then covered with a layer of nitride which isolates it from the nitrogen and the reaction stops almost completely. If the temperature drops back to solidification of calcium, the reaction resumes but in a considerably slower form as the initial sample, formed by turnings of large specific surface, has transformed into a mass of agglomerated calcium and calcium nitride, of small specific surface and large thickness, considerably slowing down the reaction.

In order to avoid this difficulty, it is commonplace to conduct the nitriding reaction taking care that the temperature does not exceed 839° C. at any point of the turnings. By operating by injection of successive puffs of nitrogen between which the calcium is allowed to cool down to about 650° C., complete nitriding of the calcium can be achieved. This process is however not adaptable to large-scale production as it takes about ten hours to nitride each batch of calcium.

OBJECT OF THE INVENTION

The object of the invention is to achieve a calcium nitride synthesis process able to produce calcium nitride quickly, in large quantity and with economical raw materials.

According to the invention, this object is achieved by the fact that the calcium source is a molten zinc-calcium alloy and that the nitrogen is previously heated to a temperature greater than or equal to the melting temperature of the zinc-calcium alloy.

According to one feature of the invention, the zinc contained in the zinc-calcium alloy is vaporized by the heat released during the nitriding reaction of calcium, condenses on cooled walls of the reactor and is collected at the bottom of the reactor.

According to a development of the invention, the zinc-calcium alloy is sprayed into the top of the reactor in the form of droplets and the height of the reactor is adapted to the reaction kinetics, so that a significant fraction of the calcium contained in the droplets is nitrided during falling of the latter.

According to another development of the invention, the zinc-calcium alloy is sprayed in the form of fine droplets, propelled by a jet of pressurized nitrogen heated to a temperature close to that of the sprayed zinc-calcium alloy, the flowrate of the nitrogen jet being preferably greater than or equal to the quantity required to completely nitride the calcium contained in the sprayed zinc-calcium alloy.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

According to the invention, calcium nitride synthesis is performed by making nitrogen react with a molten zinc-calcium alloy in a reactor. The nitrogen is previously heated to a temperature greater than or equal to the melting temperature of the zinc-calcium alloy.

Figure 1:
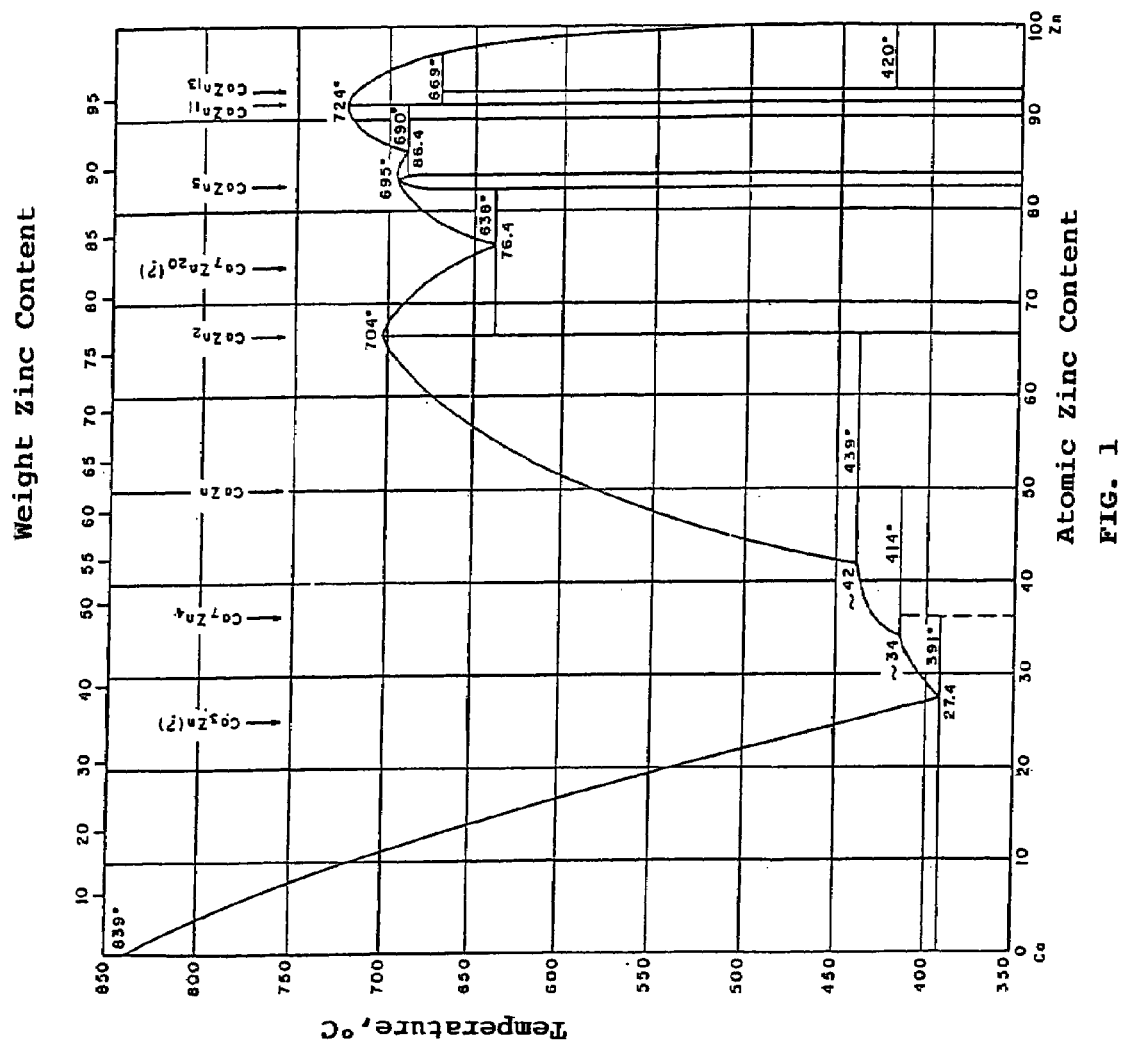
FIG. 1 is a phase diagram of the zinc-calcium alloy versus the atomic zinc content.

The use of the zinc-calcium alloy as calcium source in the nitriding process is particularly interesting because, as taught by R. Juza et al. (Z. Anorg. Chem., 239 p273, 1938), zinc nitride ($Zn_3N_2$) cannot form by direct reaction of hot metallic zinc on nitrogen. Moreover, as indicated in the diagram of FIG. 1, calcium-rich zinc-calcium alloys have a melting temperature much lower than that of pure calcium. The zinc-calcium alloy preferably has an atomic calcium content greater than or equal to 50%, and more particularly comprised between 50% and 80%.

Figure 2:
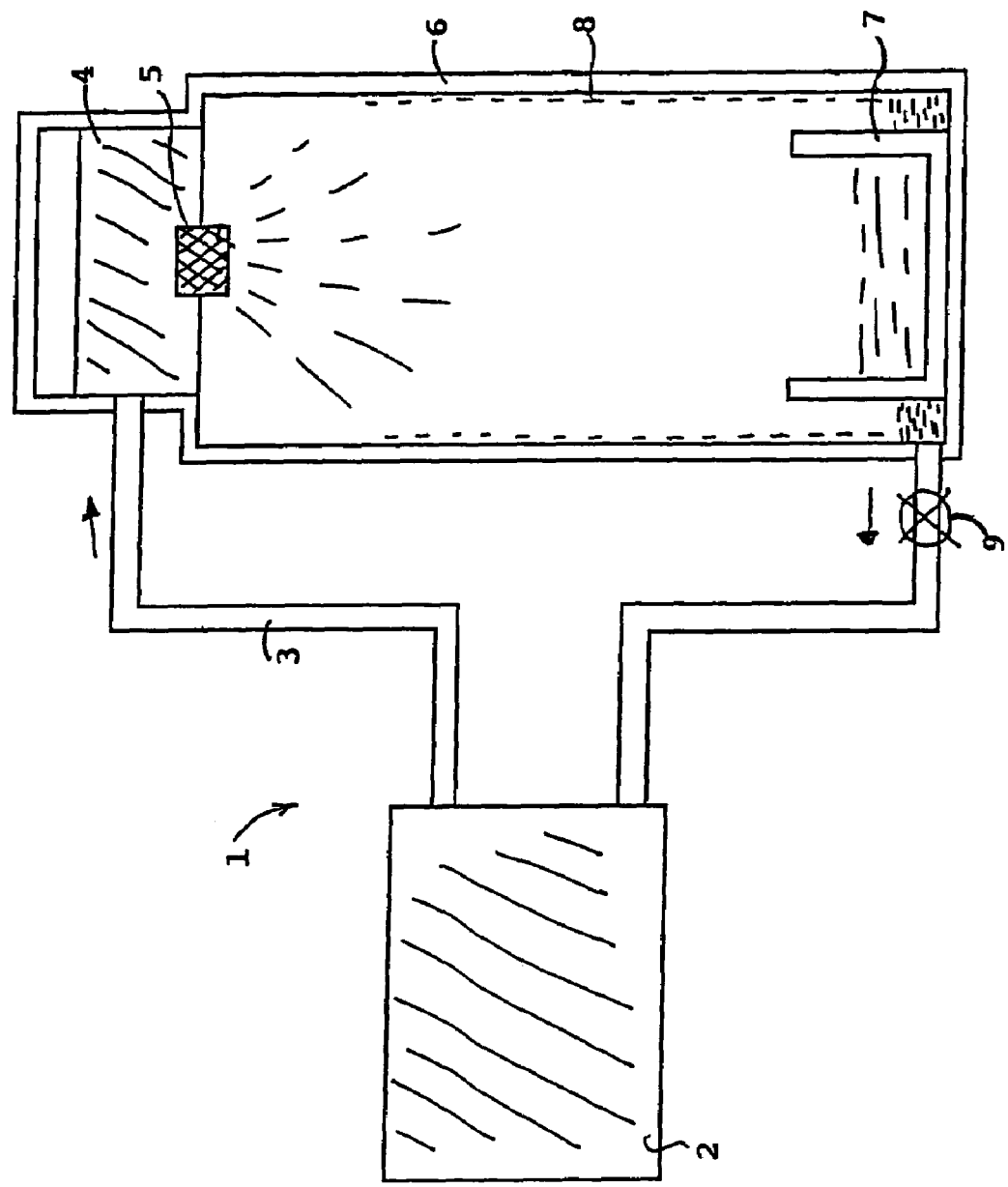
FIG. 2 represents in schematic form a first embodiment of a device enabling a synthesis process according to the invention to be implemented.

In a particular embodiment, as represented in FIG. 2, a device 1 enabling calcium nitride synthesis to be performed comprises a tank 2 containing the molten zinc calcium alloy. The latter is transferred via a feed pipe 3 to a furnace 4 in which it is heated to and/or kept at a preset, temperature, greater than or equal to its melting temperature. The furnace 4 can comprise means designed to apply an adjustable pressure to the molten alloy. These means are preferably means for injecting an inert gas such as argon. The zinc-calcium alloy is then sprayed in the form of droplets by means of a sprayer 5 arranged at the interface of the furnace 4 and of the top of a reactor 6. The sprayer 5 can be of any type. A sprayer for example such as the sprayer described in the Patent EP-B1-0268627 is used, which patent relates to a process and device for granulating a molten material, in particular calcium and magnesium.

The device 1 comprises means for feeding the reactor 6 with nitrogen (not represented in FIG. 2), the nitrogen feed supply preferably being performed continuously so as to maintain a preset pressure in the reactor.

The calcium contained in the droplets then reacts with the nitrogen in the reactor 6 to form calcium nitride. The height of the reactor 6 is sufficiently great for a significant fraction of calcium contained in the droplets to be nitrided during the fall of the droplets. A collector unit 7 (FIG. 2) arranged in the lower part of the reactor collects the droplets at the end of their fall and is maintained at a temperature of at least 650° C. so that the nitriding reaction can continue at the level of the collector unit.

The reactor 6 is also equipped with means enabling the vertical walls of the reactor 6 to be heated and/or cooled. When the reaction begins, the heating increases the temperature of the nitrogen to a temperature close to the initial temperature of the droplets sprayed into the reactor 6. After the reaction has started, the heating is cut off and replaced by cooling which reduces the temperature of the reactor walls to a temperature close to 500° C. so as to remove the heat given off when the nitriding reaction takes place.

During the nitriding reaction, which is very exothermal, the zinc contained in the sprayed droplets is vaporized by the heat released during the nitriding reaction of calcium and condenses on the cooled walls of the reactor 6 in the form of drops 8 of liquid zinc, represented by a broken line in FIG. 2. The liquid zinc is collected into the bottom of the reactor 6 and is extracted via a drainage valve 9. It can be reinjected into the tank 2 containing the molten zinc-calcium alloy to be used for preparation of a new alloy.

The calcium nitride produced during the reaction can be in the form of an agglomerate, which may have to be ground after having been extracted from the collector unit 7. If the calcium nitride is contaminated by a zinc residue, the zinc can be easily eliminated by vacuum distillation, for example, taking advantage of the large difference between the boiling temperature of zinc which is 907° C. and the melting temperature of calcium nitride which is 1450° C. The calcium nitride can also be contaminated by a mixed nitride $Ca_2ZnN_2$ which can be produced around 650° C., by reaction of $Ca_3N_2$ with zinc in the presence of nitrogen. This contamination can, however, easily be eliminated by heating above 700° C., the mixed nitride $Ca_2ZnN_2$ in fact being known to decompose above 700° C. (J. M. McHale et al., Chem. Eur. J.2, pages 1514 to 1517, 1996).

The zinc-calcium alloy can be obtained by melting a mixture of powders or turnings of zinc and calcium. For large volume production, it is preferably obtained by electrolysis of a calcium chloride or a calcium oxide in an electrolytic bath with a cathode made of molten zinc.

Figure 3:
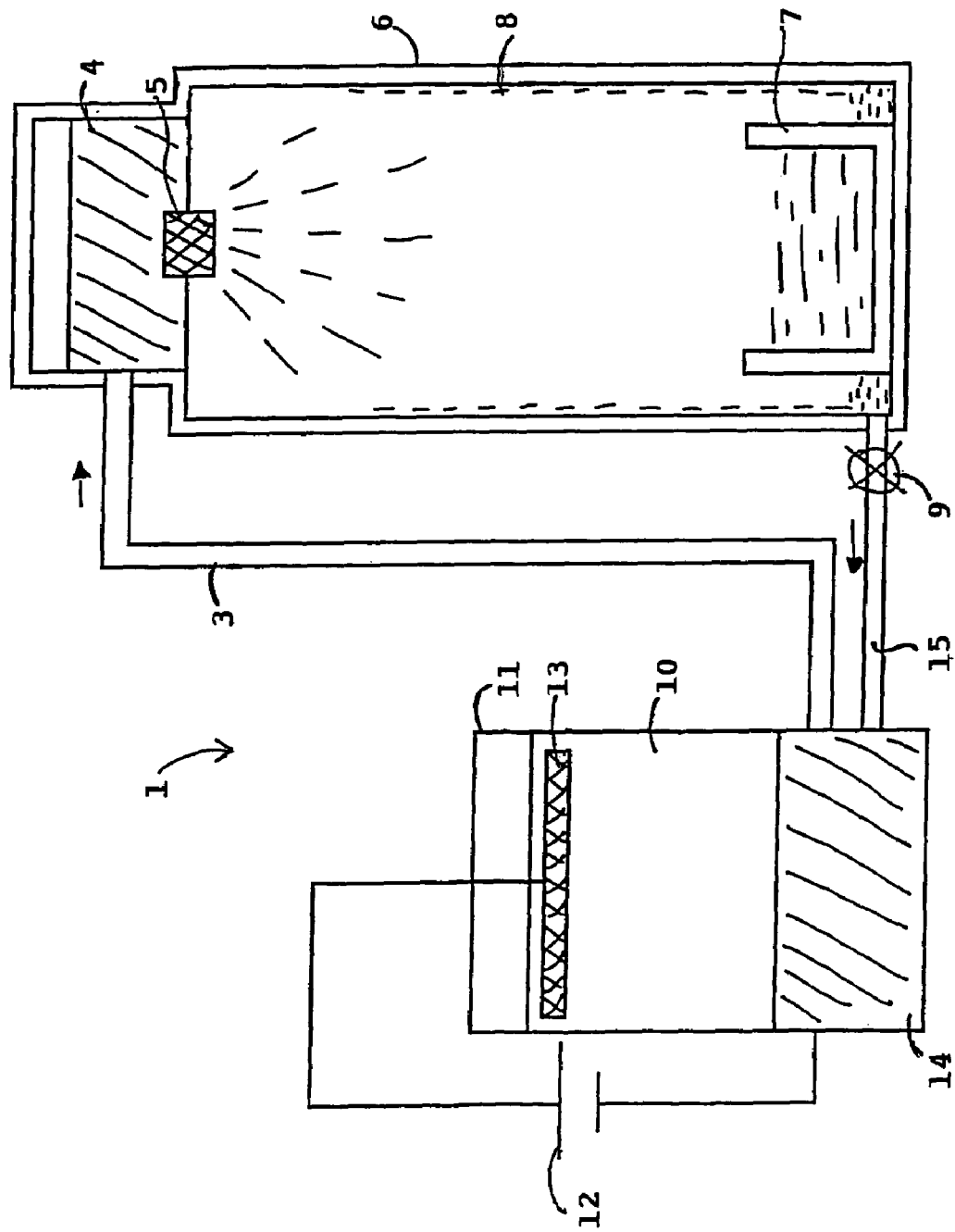
FIG. 3 represents in schematic form a second embodiment of a device enabling a synthesis process according to the invention to be implemented.

Production of the zinc-calcium alloy can be integrated in the calcium nitride fabrication process, as represented in FIG. 3. The zinc-calcium alloy is then obtained by electrolysis of calcium chloride or $CaCl_2$ in an electrolytic cell 11 connected to a current generator 12. The electrolytic cell 11 is formed by an anode 13, preferably made of graphite, and a cathode 14 formed by a molten zinc bath. When the current flows, the molten zinc bath is progressively enriched in calcium whereas the anode 13 collects the chlorine given off in the course of the electrolytic reaction.

The zinc-calcium alloy thus obtained is then transferred to the furnace 4 via the feed pipe 3, and is input and treated in the reactor 6 according to FIG. 2. The zinc collected at the bottom of the reactor 6 can then be re-injected into the molten zinc bath constituting the cathode 14 via the drainage valve 9 and an outlet pipe 15 to be re-used for preparation of a new alloy.

The zinc recycled to the electrolytic cell is liable to be contaminated by calcium nitride or calcium oxide (CaO). A part of the calcium nitride powder produced in the reactor could in fact be trapped by the zinc condensed along the walls. Likewise the presence of a little oxygen in the reactor, notably following a slight contamination of the industrial nitrogen used, can produce calcium oxide, which is in turn liable to be trapped by the liquid zinc. Any contamination by calcium nitride or calcium oxide will be eliminated when electrolysis takes place. The two contaminating compounds are in fact lighter than zinc and will come into contact with the calcium chloride and dissolve therein. Furthermore, they have respective decomposition voltages (0.40V for $Ca_3N_2$ and 2.75V for CaO) which are lower than that of $CaCl_2$ (3.30V). They will therefore decompose by electrolysis producing calcium at the cathode and nitrogen or oxygen at the anode.

One of the major advantages of using a zinc-calcium alloy is that it has a much lower melting temperature than that of pure calcium, which fosters spraying of the droplets and which thus enables a higher reaction yield to be obtained by increasing the contact surface between the calcium and nitrogen. Vaporization of the zinc, during nitriding of the calcium, and subsequent condensation thereof on the walls of the reactor, also facilitate the heat transfer to the outside of the reactor and therefore enable the production flow to be increased without excessive overheating of the reactor.

This also enables fabrication of the alloy by electrolysis to be integrated into the calcium nitride synthesis process, and therefore enables the cost price to be reduced by eliminating several costly stages of the usual calcium fabrication process.

In particular, the calcium chloride electrolysis can be improved by adding different fluxing agents, and it can also be replaced by calcium oxide electrolysis.

The fact that the atomic calcium content of the zinc-calcium alloy for correct operation of the reaction is high may require a buffer tank to be fitted between the place where the zinc-calcium alloy is produced and the reactor. This buffer tank can be supplied alternately by several sources of calcium and zinc. It can also be equipped with a system for measuring the calcium content, and be able to adjust this content by adding calcium or zinc, depending on the case, to obtain the required zinc-calcium alloy.

Figure 4:
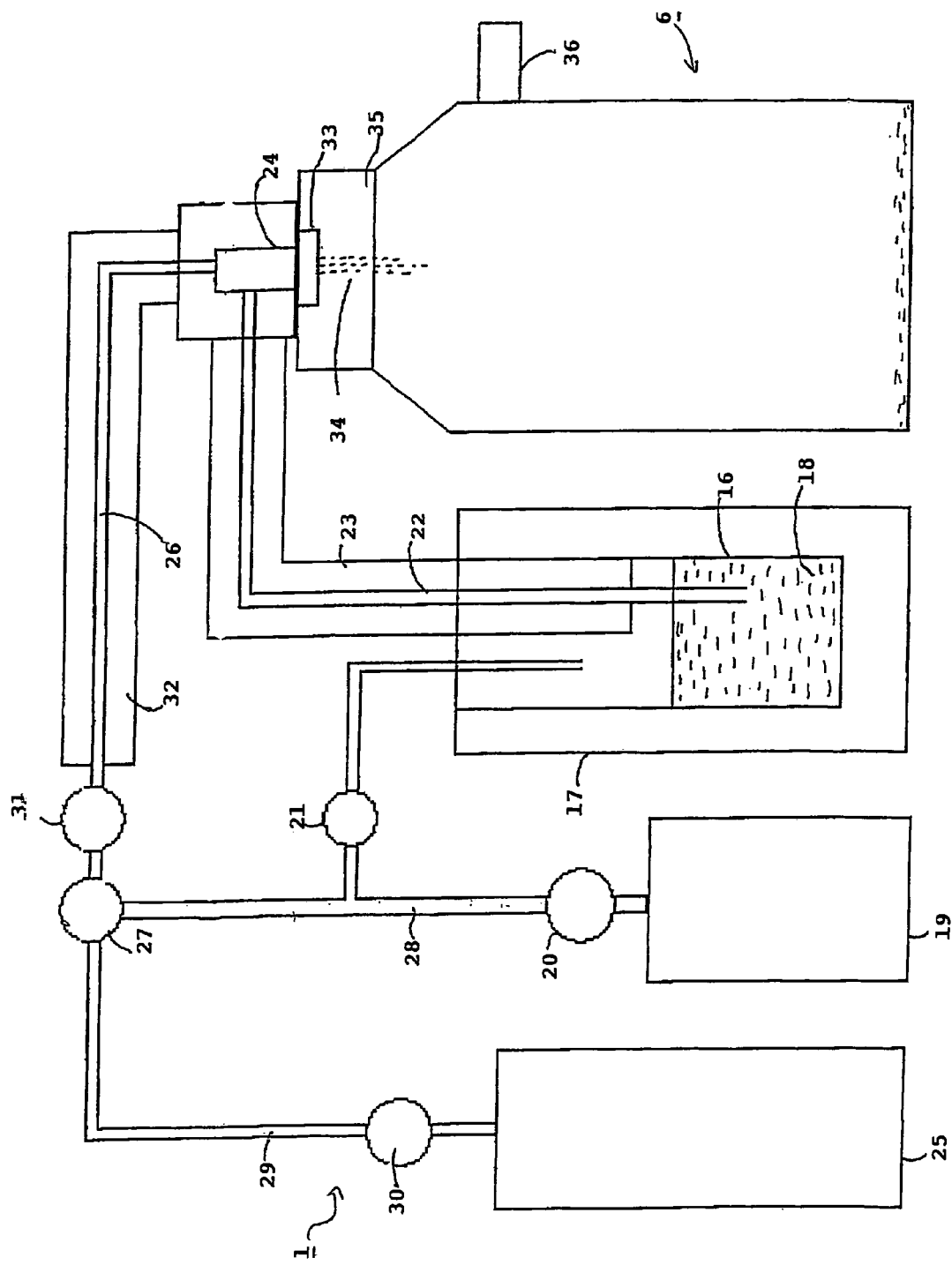
FIG. 4 represents in schematic form a third embodiment of a device enabling a synthesis process according to the invention to be implemented.

In another embodiment, the zinc-calcium alloy can be sprayed in the form of fine droplets propelled by a jet of pressurized nitrogen heated to a temperature close to that of the molten and sprayed zinc-calcium alloy. Thus, as represented in FIG. 4, a device 1 enabling calcium nitride synthesis to be performed comprises a first tank 16 equipped with heating means 17 designed to keep the zinc-calcium alloy 18 molten in the first tank 16. The zinc-calcium alloy 18 contained in the tank 16 is preferably chosen so as to have the lowest possible melting temperature. For example, the zinc-calcium alloy is an alloy containing a mass proportion of one third zinc for two thirds calcium, the melting temperature of such an alloy being about 420° C. The alloy is moreover pressurized by argon coming from a second tank 19 by means of first and second pressure-reducing valves 20 and 21.

A first siphoning pipe 22 protected by a heating sleeve 23 enables the molten zinc-calcium alloy to be transferred from the tank 16 to a furnace 24. The furnace 24 is designed to receive nitrogen coming from a third tank 25 but also argon coming from the second tank 19. During the starting phase of the synthesis process, it is in fact necessary to avoid a static contact between the zinc-calcium alloy and the nitrogen. Thus, during the starting phase of spraying of the zinc-calcium alloy, it is preferable to spray the latter by means of an argon jet before replacing the argon jet by a nitrogen jet. This prevents local nitriding of the calcium, at the beginning of the process, which could lead to clogging of the sprayer.

Transfer of nitrogen and argon to the furnace 24 is performed by means of an inlet pipe 26 connected to the second and third tanks 19 and 25 by means of a three-way valve 27. Thus, the three-way valve 27 is respectively connected to the second and third tanks 19 and 25 by second and third pipes 28 and 29. The third pipe 29 is equipped with a third pressure-reducing valve 30 and the inlet pipe 26 of the furnace 24 comprises a flowmeter 31 arranged near the three-way valve 27 and a heating sleeve 32 arranged between the flowmeter 31 and furnace 24.

The zinc-calcium alloy, propelled by a jet of pressurized nitrogen or argon preheated to a temperature greater than or equal to the melting temperature of the zinc-calcium alloy, is thus injected into a sprayer 33 so as to form fine droplets 34 in a reactor 6 containing nitrogen. The nitriding reaction inside the reactor can be observed through a transparent observation port 35, arranged near the sprayer 33. The reaction products are collected at the bottom part of the reactor 6 and possibly on the side walls of the reactor 6. The nitrogen pressure inside the reactor is preferably controlled by a valve 36 arranged on one of the side walls of the reactor 6 and the device 1 can comprise a nitrogen collection and recirculation system (not shown).

The zinc-calcium alloy and nitrogen are respectively heated in the first and third pipes 22 and 29 so that they both enter the furnace 24 at high temperature before being sprayed by the sprayer 33. The temperatures of the zinc-calcium alloy and of the nitrogen are preferably greater than 700° C., at the inlet of the sprayer 33, before the zinc-calcium alloy is sprayed into the reactor under the action of the argon jet. The respective flowrates of the zinc-calcium alloy and nitrogen, when inlet to the furnace 24, are adjusted so that the quantity of nitrogen inlet to the furnace is greater than or equal to that required to ensure complete nitriding of the calcium contained in the zinc-calcium alloy.

Once the zinc-calcium alloy has been sprayed in the form of fine droplets, the droplets react immediately with the hot nitrogen which propels them. As the nitriding reaction is extremely exothermal, it results in a fast temperature rise of the walls of the reactor 6 and can be visualized by the appearance of a flame having a length of about 10 cm and a diameter of a few millimeters. The zinc contained in the zinc-calcium alloy thus vaporizes in the course of the reaction and then condenses on the upper parts of the reactor walls. A fine, pulverulent, dark brown-coloured powder containing calcium nitride deposits at the bottom of the reactor 6.

Different analyses can be carried out to determine the composition of the fine powder and in particular the calcium nitride contamination elements. Thus, it is possible to perform:

chemical analysis to determine the proportion of zinc with respect to the total calcium contained in the powder.

weight loss measurement after heating in a vacuum performed at a temperature of about 800° C. so as to know the proportion of matter sublimated at this temperature, the expected sublimated matter being zinc, weight loss measurement after heating in a vacuum performed at a temperature of about 1100° C. so as to know the proportion of matter sublimated at this temperature, the expected sublimated matter being zinc and a fraction of non nitrided or non oxidized calcium, weight increase measurement after calcination of a sample previously heated in a vacuum at 1100° C. so as to know the proportion of matter having reacted with the oxygen of the air, the expected matter reacting with the oxygen being the calcium nitride, an X-ray diffraction spectrum of a sample suitably protected from air so as to determine possible contaminations of the calcium nitride.

For example, a calcium nitride synthesis process was performed in a device such as that represented in FIG. 4. The zinc-calcium alloy contained in the first tank 19 comprises, in mass proportion, ⅓ zinc and ⅔ calcium. The first tank 19 is heated to a temperature of about 450° C. so as to maintain the zinc-calcium alloy above its melting temperature which is about 420° C. For argon, the first and second pressure-reducing valves 20 and 21 are respectively set to absolute pressures of 4 bars and 1.5 bars whereas for nitrogen, the third pressure-reducing valve 30 is set to an absolute pressure of 4 bars. The sprayer is preferably a sprayer 33 such as those marketed by Enami Spraying Systems.

The respective nitrogen and zinc-calcium alloy flowrates are respectively 5 l/mn at a pressure of 4 bars (i.e. about 26 g/mn of nitrogen) and 75 g/mn (i.e. 50 g/mn of calcium contained in the alloy). The mass ratio between the nitrogen and calcium respectively injected into the reactor is therefore about 0.5 whereas the mass ratio necessary for complete nitriding of the calcium is 0.23. The synthesis process therefore operates with an excess of nitrogen of more than 100% with respect to the minimum required for the reaction. This excess can be significantly reduced by using a reactor able to operate continuously, with a high temperature inside the reactor.

The invention claimed is:
1. Calcium nitride synthesis process according to which nitrogen is made to react with a calcium source in a reactor, process wherein the calcium source is a molten zinc-calcium alloy and the nitrogen is previously heated to a temperature greater than or equal to the melting temperature of the zinc-calcium alloy.

2. Synthesis process according to claim 1, wherein the zinc contained in the zinc-calcium alloy is vaporized by the heat released during the nitriding reaction of calcium, condenses on cooled walls of the reactor and is collected into the bottom of the reactor.

3. Synthesis process according to claim 1, wherein the calcium nitride produced is extracted from the reactor, and the residual zinc contained in the calcium nitride is eliminated from the latter by vacuum distillation.

4. Synthesis process according to claim 2, wherein the zinc collected by condensation or distillation during the process is reused for preparation of a new alloy.

5. Synthesis process according to claim 1, wherein the zinc-calcium alloy is obtained by electrolysis of a molten salt containing a calcium chloride or oxide, in an electrolytic bath with a cathode containing zinc in molten form.

6. Synthesis process according to claim 1, wherein the atomic calcium content of the zinc-calcium alloy is greater than or equal to 50%.

7. Synthesis process according to claim 1, wherein the zinc-calcium alloy is sprayed into the top of the reactor in the form of droplets and the height of the reactor is adapted to the reaction kinetics, so that a significant fraction of the calcium contained in the droplets is nitrided during falling of the latter.

8. Synthesis process according to claim 1, wherein the zinc-calcium alloy is sprayed in the form of fine droplets, propelled by a jet of pressurized nitrogen heated to a temperature close to that of the sprayed zinc-calcium alloy.

9. Synthesis process according to claim 8, wherein the flowrate of the nitrogen jet is greater than or equal to the quantity required to completely nitride the calcium contained in the sprayed zinc-calcium alloy.

10. Synthesis process according to claim 8, wherein in a starting phase, the zinc-calcium alloy is previously sprayed under the impulse of a pressurized argon jet heated to a temperature close to that of the sprayed zinc-calcium alloy.

11. Synthesis process according to claim 7, wherein the temperature of the zinc-calcium alloy and the temperature of the nitrogen are greater than 700° C. before the zinc-calcium alloy is sprayed.

12. Synthesis process according to claim 7, wherein the calcium nitride produced in the course of the reaction is collected in a collector unit located at the bottom of the reactor.

13. Synthesis process according to claim 12, wherein the collector unit is kept at a temperature greater than or equal to 650° C.

* * * * *